(12) United States Patent
Varghese et al.

(10) Patent No.: US 8,837,315 B2
(45) Date of Patent: Sep. 16, 2014

(54) SMART ZONING USING DEVICE ALIAS DATABASE

(75) Inventors: Sunil Varghese, Bangalore (IN); V.V. Krishna Rao Gubbala, Bangalore (IN); Mariappan Balraj, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 199 days.

(21) Appl. No.: 13/465,294

(22) Filed: May 7, 2012

(65) Prior Publication Data

US 2013/0297866 A1   Nov. 7, 2013

(51) Int. Cl.
*H04L 12/26* (2006.01)

(52) U.S. Cl.
USPC ............ 370/252; 709/220; 709/221; 709/222

(58) Field of Classification Search
USPC ........................... 370/252; 709/220, 221, 222
See application file for complete search history.

(56) References Cited

U.S. PATENT DOCUMENTS

| | | | |
|---|---|---|---|
| 7,275,103 B1* | 9/2007 | Thrasher et al. | 709/224 |
| 7,401,338 B1* | 7/2008 | Bowen et al. | 719/328 |
| 7,533,169 B1* | 5/2009 | Gold et al. | 709/224 |
| 7,774,445 B1 | 8/2010 | Weinbrecht et al. | |
| 2002/0176434 A1* | 11/2002 | Yu et al. | 370/422 |
| 2006/0251111 A1* | 11/2006 | Kloth et al. | 370/464 |
| 2011/0022691 A1 | 1/2011 | Banerjee et al. | |
| 2011/0022693 A1* | 1/2011 | Cheethirala et al. | 709/222 |
| 2012/0030599 A1 | 2/2012 | Butt et al. | |
| 2013/0117766 A1* | 5/2013 | Bax et al. | 719/323 |

FOREIGN PATENT DOCUMENTS

WO    WO 00/55750    9/2000

OTHER PUBLICATIONS

International Search Report mailed Sep. 4, 2013 in Application No. PCT/US2013/039712, 11 pages.

* cited by examiner

*Primary Examiner* — Kenny Lin
(74) *Attorney, Agent, or Firm* — Merchant & Gould

(57) ABSTRACT

Systems and methods are disclosed to implement smart zoning using device alias database that preserves TCAM space. Embodiments may consider device types to save an administrator's efforts from splitting application specific zones into two-member (initiator and target) zones.

20 Claims, 5 Drawing Sheets

200

```
┌─────────────────────────────────────┐
│ Obtain device types of first zone   │
│ members (devices) from a device     │
│ alias database                      │
│ 210                                 │
└─────────────────────────────────────┘
                  │
                  ▼
┌─────────────────────────────────────┐
│ If device type is not found then    │
│ consider it as both initiator and   │
│ target                              │
│ 220                                 │
└─────────────────────────────────────┘
                  │
                  ▼
┌─────────────────────────────────────┐
│ Identify all possible initiator and │
│ target pairs of the first zone      │
│ 230                                 │
└─────────────────────────────────────┘
                  │
                  ▼
┌─────────────────────────────────────┐
│ Access control entry between all    │
│ the identified pairs of the first   │
│ zone are programmed into TCAM       │
│ 240                                 │
└─────────────────────────────────────┘
                  │
                  ▼
┌─────────────────────────────────────┐
│ Repeat steps 210-240 for all zones  │
│ in the zoneset                      │
│ 250                                 │
└─────────────────────────────────────┘
```

FIG. 2

SMART ZONING USING DEVICE ALIAS DATABASE

BACKGROUND

In storage area networks, an N member zone may need N*(N−1) ternary content-addressable memory ("TCAM") entries to support hard zoning. In general, the communication will not happen among targets or among initiators. Occasionally, there will be exceptions, such as when array ports (normally targets) must communicate with each other to perform array-based replication. There is a need for a way to optimize the TCAM spaces needed for zoning by not programming entries between two hosts or between two targets based on consideration of the device types.

BRIEF DESCRIPTION OF THE DRAWINGS

The accompanying drawings, which are incorporated in and constitute a part of this disclosure, illustrate various embodiments. In the drawings:

FIG. 2 is a flow chart of embodiments for smart zoning;

DESCRIPTION OF EXAMPLE EMBODIMENTS

Overview

Figure 1:
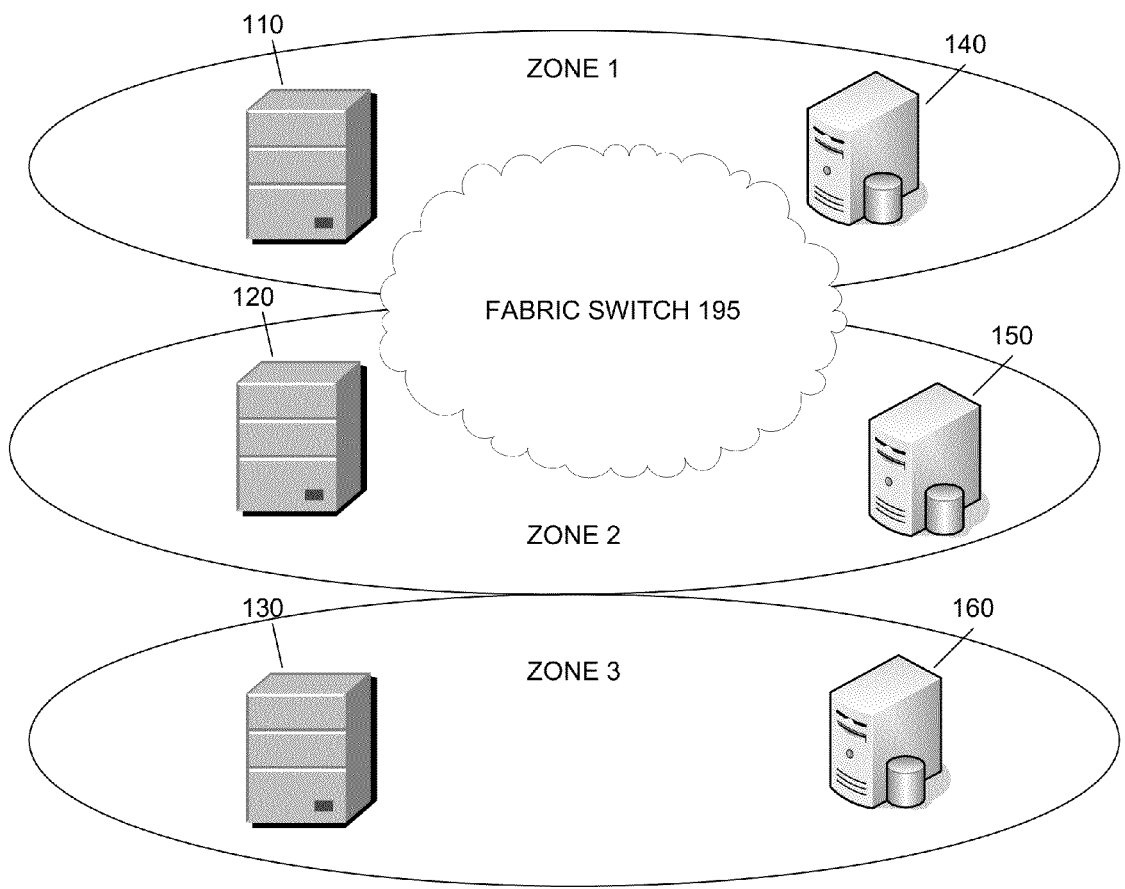
FIG. 1 is an illustration of an operating environment for embodiments described herein.

Consistent with embodiments of the present disclosure, systems and methods are disclosed for smart zoning using a device alias database.

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Zoning may enable access control between storage devices and hosts. Creating zones may increase network security. Zone sets consist of one or more zones in a Virtual Storage Area Network. A zone set can be activated or deactivated as a single entity across all switches in the Virtual Storage Area Network, but only one zone set can be activated at any time in a Virtual Storage Area Network. Zones may be members of more than one zone set. A zone may consist of multiple zone members.

In a Storage Area Network, zone server supports access control mechanisms across initiators and targets. In some embodiments, initiators may be host devices. Similarly, is some embodiments, targets may be storage devices. When a user wishes to provide access among particular initiators and targets, the desired devices may be added to the same zone.

Members in a zone may access each other, whereas members in different zones may not have access to each other. In prior embodiments, an N member zone needs N*(N−1) TCAM entries to support hard zoning. In some embodiments, hard zoning restricts actual communication across a fabric. This requires efficient hardware implementation (frame filtering) in the fabric switches, but results in a more secure connection.

Communication will not occur among targets or among initiators except for some applications such as clustering and replication. Creating Access Control List ("ACL") entries between two targets or two initiators is not necessary in embodiments of the present disclosure. As such, the user establishes a 2 member zone between "initiator and target" to preserve TCAM space to support more zones.

The user may have to create these member zones based on applications. The user was required to put more effort into creating a 2 member zone as discussed. Embodiments of smart zoning in the present disclosure reduce the user's efforts required to support more zoning by considering the device type while programming zoning entries in the TCAM. The device type may include initiator devices, target devices, or both.

A multilayer fabric switch device may contain a device alias database. The device alias database may support mapping between device alias names and Port World Wide Name ("pWWN"). pWWN is the 8 byte value which uniquely identifies a device in the multilayer fabric switch device. In a specific zone, the members can be defined using pWWN. If pWWN is used, zoning may remain independent of the port where the device is connected.

Embodiments of the present disclosure may be extended to configure device types as well. As such, when the device types are configured in the device alias database, the information may be used by a zone server while programming zoning entries in the TCAM to apply optimization. If the device type has not been configured, the programming may be performed in the traditional manner as described above.

It should be noted that embodiments of the present disclosure may not need zone configuration changes. Furthermore, present embodiments may support all zone member types.

Some embodiments of the present disclosure use smart zoning to preserve memory in the TCAM. FIG. 1 illustrates a sample operating environment for embodiments of smart zoning. A number of host devices (initiator devices) such as host device 110, host device 120, and host device 130 may be in communication with a switching device, such as multilayer fabric switch 195.

The host devices may be in, or wish to be in, communication with target devices, such as target device 140, target device 150, and target device 160. The target devices may be storage devices. The storage devices may contain all types of data.

FIG. 2 is a flow chart illustrating embodiments of smart zoning. Method 200 may begin at step 210 where an access control mechanism connected to a plurality of network devices may obtain device types for first zone members (network devices) from a device alias database. The network devices may include initiator devices and target devices. As such, the device type may contain information that indicates whether a device is one of: an initiator device and a target device.

In some embodiments, the device alias database may support mapping between device alias names and port world wide names. Furthermore, the port world wide names may comprise a unique identifier of a device in a multilayer fabric switch device.

A first zone may be established. The first zone may solely comprise a first initiator device and a first target device. In some embodiments, the first initiator device may comprise a host device. Similarly, in some embodiments, the first target device may comprise a storage device.

Method 200 may then proceed to step 220. At step 220, if the device type is not found for a particular zone member, that zone member may be considered to be both an initiator and target. Next, at step 230, all possible initiator and target pairs of the first zone may be identified.

Subsequently, at step 240, access control entries may be programmed into a memory based at least in part on the obtained device types. In some embodiments, the memory is a ternary content-addressable memory ("TCAM"). The zoning entries may provide information to indicate the zoning relationships. In some embodiments, established zones may support and implement hard zoning protocols. Steps 210-240 of method 200 may be repeated for a plurality of zones in a zoneset.

In some embodiments of the present disclosure, it may be determined whether the device types are configured in the device alias database. If the device types are not configured in the device alias database, device types may not be considered for programming zoning entries.

In some embodiments, a first initiator device and a first target device may be identified based on device types derived from a first database. A first two-member zone may be established inclusive of the first initiator device and the first target device. Subsequently, a second initiator device and a second target device may be identified based on device types derived from the first database.

Furthermore, a second two-member zone may be established between the second initiator device and the second target device. The newly-created two-member zones may be associated as part of the same zone set.

Figure 3:
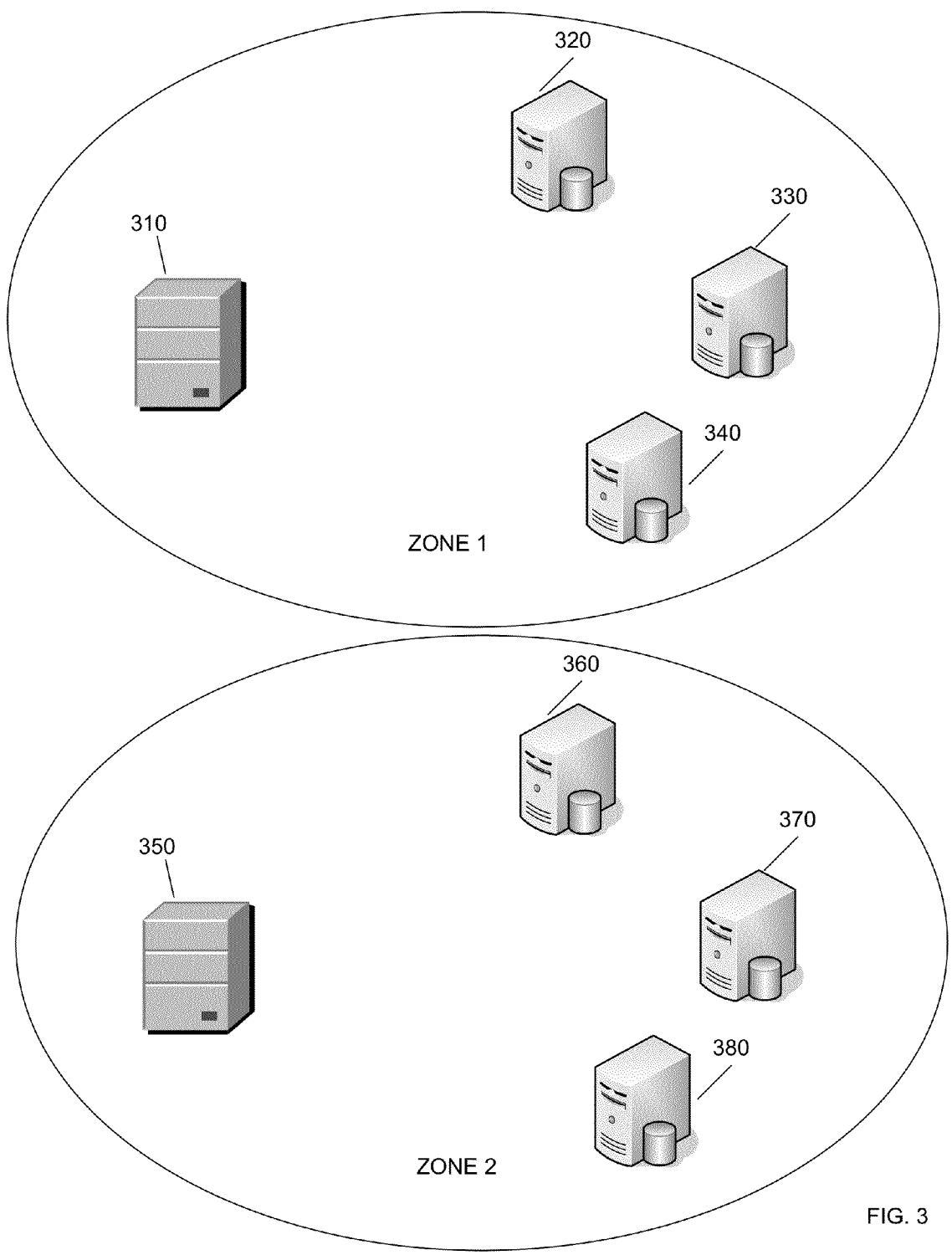
FIG. 3 is a flow chart of embodiments for smart zoning.

FIG. 3 illustrates a sample operating environment for embodiments of smart zoning. A host device (initiator device) such as host device 310 may serve as an initiator device for zone 1. Zone 1 may further contain communicable target devices, such as target device 320, target device 330, and target device 340. The target devices may be storage devices.

Similarly, a host device (initiator device) such as host device 350 may serve as an initiator device for zone 2. Zone 2 may further contain communicable target devices, such as target device 360, target device 370, and target device 380. Prior art systems would not have obtained the device types for the devices in zone 1 and zone 2. As a result, when present embodiments of smart zoning are not used, TCAM entries must be made for each two-device relationship discovered in each zone.

Figure 4:
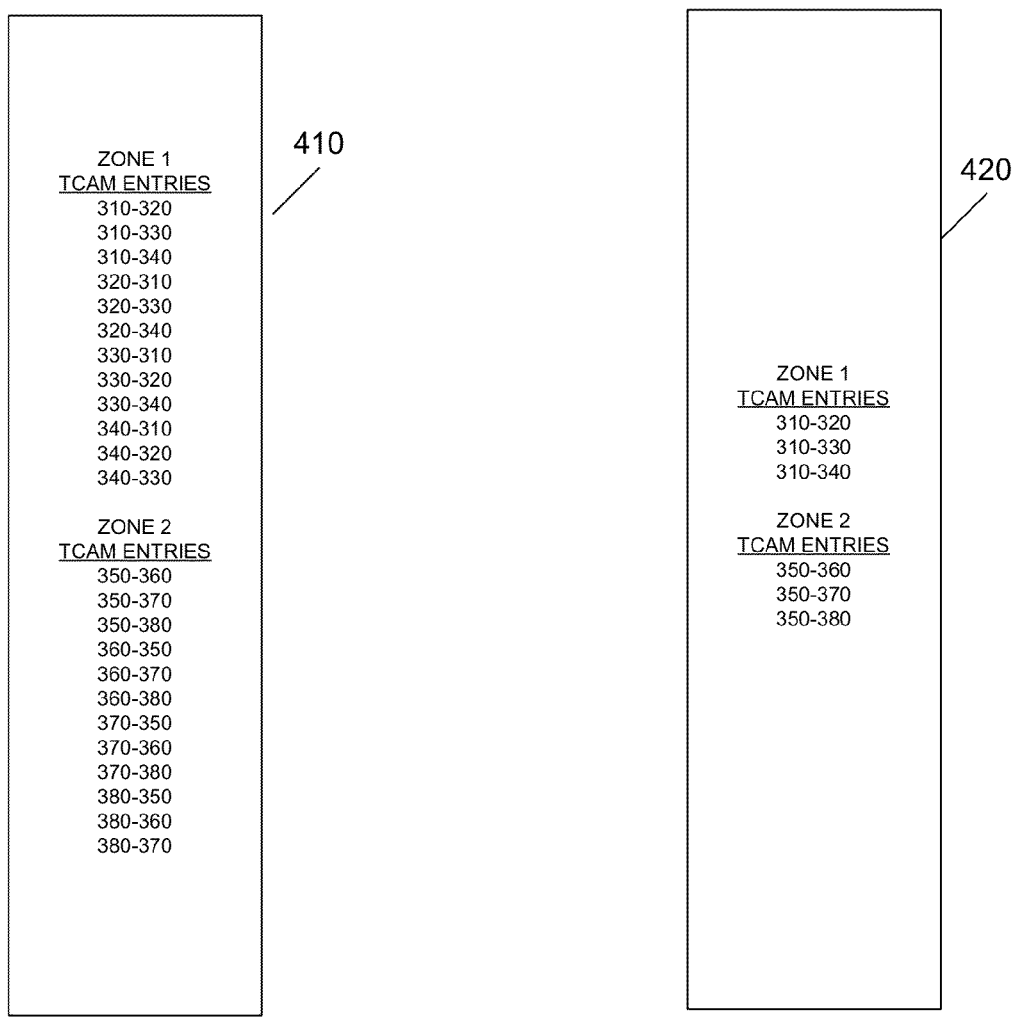
FIG. 4 illustrates a TCAM entry table.

FIG. 4 illustrates a TCAM entry table 410 which is representative of the large number of entries required by the prior art systems. As discussed above, each zone contains 4 members, which results in 4*(4−1)=12 TCAM entries for each zone.

Alternatively, if embodiments of the present disclosure are employed, the illustrated devices may be identified within each zone. As seen in table 420, the number of TCAM entries required is greatly reduced.

Figure 5:
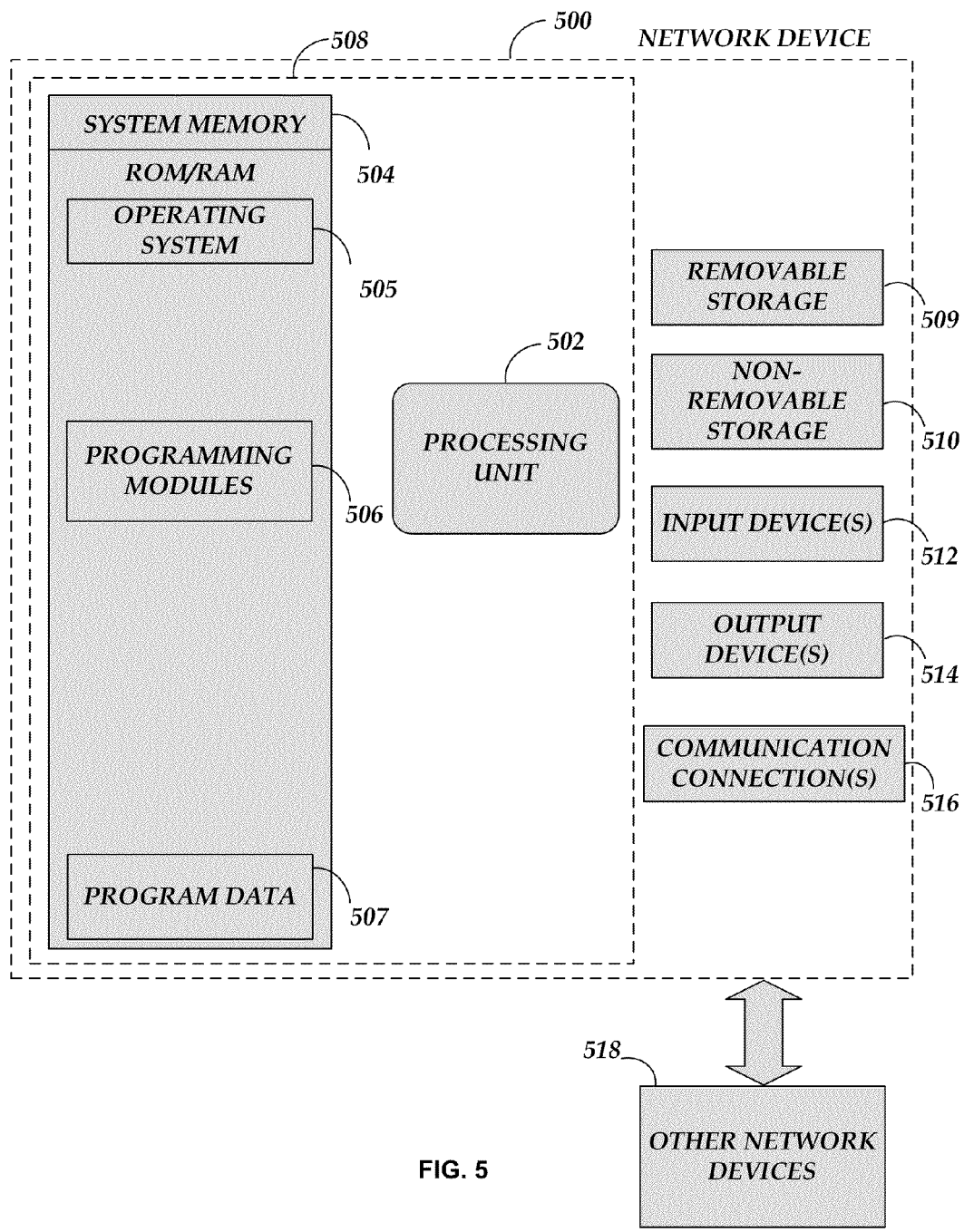
FIG. 5 is a block diagram of a network computing device.

FIG. 5 is a block diagram of a system including network device 500. Consistent with embodiments of the present disclosure, the aforementioned memory storage and processing unit may be implemented in a network device, such as network device 500 of FIG. 5. Any suitable combination of hardware, software, or firmware may be used to implement the memory storage and processing unit. For example, the memory storage and processing unit may be implemented with network device 500 or any of other network devices 518, in combination with network device 500. The aforementioned system, device, and processors are examples and other systems, devices, and processors may comprise the aforementioned memory storage and processing unit, consistent with embodiments of the present disclosure.

With reference to FIG. 5, a system consistent with embodiments of the present disclosure may include a network device, such as network device 500. In a basic configuration, network device 500 may include at least one processing unit 502, a secure processing unit for decryption 520, and a system memory 504. Depending on the configuration and type of network device, system memory 504 may comprise, but is not limited to, volatile (e.g., random access memory (RAM)), non-volatile (e.g., read-only memory (ROM)), flash memory, or any combination. System memory 504 may include operating system 505, one or more programming modules 506, and may include program data 504. Operating system 505, for example, may be suitable for controlling network device 500's operation. Furthermore, embodiments of the present disclosure may be practiced in conjunction with a graphics library, other operating systems, or any other application program and is not limited to any particular application or system. This basic configuration is illustrated in FIG. 5 by those components within a dashed line 508.

Network device 500 may have additional features or functionality. For example, network device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by network device 500. Any such computer storage media may be part of device 500. Network device 500 may also have input device (s) 512 such as a keyboard, a mouse, a pen, a sound input device, a touch input device, etc. Output device(s) 514 such as a display, speakers, a printer, etc. may also be included. The aforementioned devices are examples and others may be used.

Network device 500 may also contain a communication connection 516 that may allow device 500 to communicate with other network devices 518, such as over a network in a distributed network environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502 or secure processing unit for decryption 520, programming modules 506 may perform processes including, for example, one or more method 200's stages as described above. The aforementioned process is an example; processing unit 502 and secure processing unit for decryption 520 may perform other processes.

Generally, consistent with per-subscriber stream management according to embodiments of this invention, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments of the present disclosure may also be practiced in distributed network environments where tasks are performed by remote processing devices that are linked through a communications network. In a distributed network environment, program modules may be located in both local and remote memory storage devices.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present disclosure, for example, may be implemented as a computer process (method), a network system, or as an article of manufacture, such as a computer program product or computer readable media. The computer program product may be a computer storage media readable by a computer system and encoding a computer program of instructions for executing a computer process. The computer program product may also be a propagated signal on a carrier readable by a network system and encoding a computer program of instructions for executing a computer process. Accordingly, aspects may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of per-subscriber stream management. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the present disclosure have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the present disclosure.

What is claimed is:

1. A method comprising:
supporting an access control mechanism across a plurality of network devices, wherein the network devices include initiator devices and target devices, wherein the access control mechanism is configured to: obtain device types for the network devices from a device alias database;
establish a first zone comprising a first initiator device and a first target device; and
program zoning entries into a memory based at least in part on the obtained device types.

2. The method of claim 1, wherein at least one of the plurality of initiator devices comprises a host device; and wherein at least one of the plurality of target devices is a storage device.

3. The method of claim 2, further comprising adding one or more network devices to the first zone.

4. The method of claim 1, wherein the first zone supports hard zoning protocols.

5. The method of claim 4, wherein the device type indicates that the device is one of: an initiator device and a target device.

6. The method of claim 5, wherein the memory is a ternary content-addressable memory.

7. The method of claim 1, further comprising determining whether the device types are configured in the device alias database.

8. The method of claim 7, wherein if the device types are not configured in the device alias database, not considering device types for programming zoning entries.

9. The method of claim 1, wherein the device alias database supports mapping between device alias names and port world wide names.

10. The method of claim 9, wherein the port world wide names comprise a unique identifier of a device in a multilayer fabric switch device.

11. A network device comprising:
a first memory; and
a processor, wherein the processor is configured to:
create access control entries for the two member zone based on at least on device types determined from a device alias database; and
establish a two member zone comprising an initiator device and a target device.

12. The network device of claim 11, wherein the network device is a multilayer fabric switch device.

13. The network device of claim 12, wherein the network device resides in a storage area network.

14. The network device of claim 13, wherein the first memory comprises a ternary content-addressable memory.

15. The network device of claim 14, further comprising adding the access control entries to the ternary content-addressable memory.

16. A method comprising:
identifying a first initiator device and a first target device based on device types derived from a first device alias database; and
establishing a first two member zone between the first initiator device and the first target device.

17. The method of claim 16, wherein the first device alias database is residing on a multilayer fabric switch device.

18. The method of claim 16, further comprising: identifying a second initiator device and a second target device based on device types derived from the first device alias database; establishing a second two member zone between the second initiator device and the second target device; and including the first two member zone and the second two member zone in the same zone set.

19. The method of claim 18, wherein the first device alias database stores device type information for network devices in a plurality of zones.

20. The method of claim 18, further comprising programming zoning entries associated with the member zones in first memory.

* * * * *